United States Patent [19]

Joshi

[11] 4,017,574
[45] Apr. 12, 1977

[54] PROCESS FOR MAKING VARIEGATED SOAP

[75] Inventor: Hargovind Himatlal Joshi, Piscataway, N.J.

[73] Assignee: Colgate-Palmolive Company, New York, N.Y.

[22] Filed: June 4, 1975

[21] Appl. No.: 583,801

[52] U.S. Cl. .................................. 264/75; 252/90; 252/132; 252/134; 252/DIG. 16; 264/102; 264/148; 264/245; 264/320

[51] Int. Cl.² .................... B29F 3/12; C11D 13/08; C11D 13/18

[58] Field of Search ..... 252/90, 134, 132, DIG. 16; 264/75, 245; 425/131.1

[56] References Cited

UNITED STATES PATENTS

| | | | |
|---|---|---|---|
| 3,479,429 | 11/1969 | Morshauser et al. | 264/75 |
| 3,485,905 | 12/1969 | Compa et al. | 252/134 |
| 3,598,746 | 8/1971 | Kaniecki et al. | 252/DIG. 16 |
| 3,676,538 | 7/1972 | Patterson | 264/75 |
| 3,814,698 | 6/1974 | Ferrara et al. | 252/134 |

OTHER PUBLICATIONS

Martin—Mod. Soap & Detergent Industry vol. II 1951, Techn. Press Ltd. p. Sect. I, 19.
Hackh's, Chem. Dict. 4th Ed., 1969, McGraw–Hill pp. 721–722.

*Primary Examiner*—Harris A. Pitlick
*Attorney, Agent, or Firm*—Kenneth A. Koch; Herbert S. Sylvester; M. M. Grill

[57] ABSTRACT

A process for making multicolored soap bars wherein a coloring agent is dispersed in a meltable solid vehicle and introduced into a base soap material as a liquid colored material before the base soap material is extruded in the form of a continuous log which is subsequently cut and pressed to form a multicolored soap bar. The meltable solid material solidifies upon contact with the base soap material to form variegated, striated or marbleized colored regions in the final bar.

7 Claims, No Drawings

PROCESS FOR MAKING VARIEGATED SOAP

BACKGROUND OF THE INVENTION

This invention relates to a process for making multi-colored soap bars and particularly to a process enabling the production of an improved variegated, striated or marbleized soap bar wherein the color striations are sharper and more distinct relative to soap bars produced by prior art processes.

Various processes are known wherein milled soap of a base color such as white is introduced into a more or less conventional double barrel plodder along with a suitable coloring agent whereby the extruded column exhibits color striations, and the column is subdivided and pressed to form bars of variegated soap. For example, see Compa et al U.S. Pat. No. 3,485,905 which teaches adding the coloring agent in the form of an aqueous dye solution to the vacuum chamber between the upper and lower plodder barrels. Other apparatus and processes for producing marbleized or striated soap are disclosed, for example, in Matthaei U.S. Pat. Nos. 3,832,431; 3,769,225 and 3,673,294; Meyer et al U.S. Pat. No. 3,663,671 and Patterson U.S. Pat. No. 3,676,538 among others.

The Matthaei U.S. Pat. No. 3,673,294 describes a process for producing multicolored soap base including the addition of a secondary soap component having a color different from that of the base soap into the vacuum chamber of a double barrel vacuum plodder. The colored soap is added in the form of segments of solid soap extruded from an auxiliary plodder.

The coloring agent employed is usually a color dye or pigment material that is not harmful to the skin and usually dissolved and/or dispersed in water and suitably introduced into the base soap being worked in the plodder. Preferably the coloring agent is a water soluble dye certified by the Food and Drug Administration for external cosmetic or drug use, i.e., FD&C or D&C or external D&C dyes. A water soluble coloring agent is preferable to a water insoluble dye or pigment material because the former avoids any problem of an insoluble color residue when the soap bar is being consumed and tend to be more suitable for use on the skin.

A disadvantage has been noted, however, in multicolored soap bars incorporating water soluble coloring agent in that the stripes or streaks may not be distinct or show sharp contrast with the base soap color at their edges, and this is particularly apparent at the surface of the bar. Apparently, due to the moisture content of the base soap, the colors leach into adjoining areas which results in interface bleeding between the background and colored portions and a "washed out" appearance. This bleeding effect also occurs when water insoluble pigments are used as the coloring agent, although to a lesser degree. The bleeding effect becomes increasingly more apparent as the moisture content of the soap increases, particularly over 12% moisture by weight.

The invention includes the advantageous discovery that when a coloring agent is dispersed in a meltable solid vehicle as described herein and combined with the base soap material as a liquid colored material including the coloring agent and the vehicle the foregoing bleeding effect is minimized and the streaks or stripes in the resulting bars are sharper and more distinct, thereby creating greatly improved appearance. Moreover when the coloring agent is dispersed in a meltable solid vehicle according to the invention the total viscosity of the dispersion is increased so that less coloring agent is required to obtain the same effect and the color variegation is more distinct.

A primary advantage of the invention is to provide a colored material comprising a dye or pigment dispersed, suspended, dissolved, or emulsified in a meltable solid vehicle that when combined with a base soap material results in an attractive soap bar that exhibits a minimum of interface bleeding.

A further advantage of the invention is to permit the use of high moisture content base soap material, i.e. 12% or more water by weight, while maintaining the color distinctiveness required for a saleable product.

Still further, the use of meltable solid vehicles for the coloring agent provides the bar with an improved "feel" and soothing and emollient effects to the skin.

A still further advantage of the invention is the use of less coloring agent to obtain a desired colored effect.

Still further, invention combines the advantages of a solid colored material after combination with the base soap material while permitting the colored material to be combined with the base soap as a liquid by spraying, dripping or injecting the colored material onto the base soap material.

SUMMARY OF THE INVENTION

The invention provides an improved method for making multicolored, striated variegated or marbleized soap bars. The method of the invention includes the steps of supplying a colored material of dissolved, dispersed, or suspended coloring agent in a vehicle that is a sprayable, drippable or injectable liquid at temperatures above about 100° F and a solid below about 80° F., combining the colored material with a base soap material to form a multicolored soap mass; extruding the soap mass to form a multicolored billet, cutting the multicolored billet into bars and pressing the bars to a desired final shape. The term soap as used herein includes saponified fatty acids as well as synthetic detergents and combinations thereof.

The coloring agent can be any dye or pigment suitable for use in a soap bar and not harmful to human skin. Water soluble FD&C, D&C, or ext. D&D dyes are particularly suitable and include ultramarine blues and pinks, cosmetic green oxides and keratin as naturally occurring in palm oil. Further suitable colored materials are those referred to in the U.S. as FD&C (food, drug and cosmetics) and D&C (drugs and cosmetics) approved dyes. Typical of coloring agents of this type are the following D&C dyes:

| COLOR | COLOR INDEX NO. |
| --- | --- |
| D&C Green No. 5 | 61570 |
| D&C Green No. 6 | 61565 |
| D&C Green No. 8 | 59040 |
| D&C Yellow No. 10 | 47005 |
| D&C Red No. 6 | 15850 |
| D&C Red No. 7 | 15850 |
| D&C Red No. 8 | 15585 |
| D&C Red No. 9 | 15585 |
| D&C Red No. 10 | 15630 |
| D&C Red No. 11 | 15630 |
| D&C Red No. 12 | 15630 |
| D&C Red No. 13 | 15630 |
| D&C Red No. 19 | 45170 |
| D&C Red No. 21 | 45380A |
| D&C Red No. 22 | 45380 |
| D&C Red No. 27 | 45410 |
| D&C Red No. 28 | 45410 |
| D&C Red No. 30 | 73360 |
| D&C Red No. 33 | 17200 |
| D&C Red No. 34 | 15880 |

| COLOR | COLOR INDEX NO. |
|---|---|
| D&C Red No. 36 | 12085 |
| D&C Red No. 37 | 45170B |
| D&C Orange No. 5 | 45370A |
| D&C Orange No. 10 | 45425A |
| D&C Orange No. 11 | 4542Na |
| D&C Orange No. 17 | 12075 |
| D&C Blue No. 1 | 42090 |
| D&C Blue No. 4 | 42090 |
| D&C Blue No. 6 | 73000 |
| D&C Blue No. 9 | 69825 |

Examples of pigments employable in the method of the invention include aluminium, barium and other metallic lakes of dyes such as those described hereinabove. Other suitable pigments are monestral green GWP, monestral blue, Calcocid yellow, chrome oxides, Ochres and titanium dioxide (white). The color of the coloring agent is chosen to contrast with the color of the base soap material and can be white when the base soap material is a color other than white.

The vehicle for the coloring agent, according to the invention, can be any meltable solid material that is not harmful to the human skin and will not react chemically with the coloring agent. The vehicle material should be liquid at a temperature above the 100° F and a solid below about 80° F. Above its melting point the vehicle should have a viscosity permitting it to be sprayed, dripped or injected and a specific gravity in the range of 0.5 to 1.0 in order to be suitably combined with the base soap material.

Suitable vehicles according to the invention are wax and wax like materials of either natural or synthetic origin having a melting point (ASTM) above about 100° F, preferably from about 100° F to about 200° F, a specific gravity from about 0.5 to 1.0 typically about 0.8 to 0.95, a molecular weight (average for mixtures) from about 200 to about 5000 and a hardness measured as tenths of a millimeter needle penetration (100 grams/5 sec./25° C ASTMD-1321) from about 1 to about 100, preferably about 10 to about 50.

Natural wax materials include mineral waxes such as paraffin and microcrystalline waxes derived from petroleum, and Montan, Lignite and Ozocerite waxes, derived from coal; Vegetable waxes such as bayberry wax, candelilla wax, carnauba wax, esparto wax, fir wax, ouricury wax, palm waxes, and cocoa butter; animal waxes such as beeswax, chinese (insect) wax and spermacetti wax.

Synthetic wax like materials include fatty alcohols and acids such as cetyl alcohol, Lanette wax, stearyl alcohol, Polawax, stearic acid, palmitic acid and myristic acid; fatty acid esters and glycerides such as glyceryl stearates (mono, di and tri), hydrogenated oils such as coconut, whale and cottonseed oils that have been completely hydrogenated and Carbowaxes. Carbowax is the trademark for certain solid polyethylene glycols that have a waxy appearance and felling, and a melting point from about 100°–130° F.

In preparing the colored material of the invention, the vehicle is first melted and a suitable or desired amount of coloring agent is dispersed or suspended therein to form a uniformly colored liquid. The colored liquid is maintained about its melting point and is sprayed, dripped or injected onto or into the base soap material. The base soap material is at a temperature below the solidification point of the colored vehicle and solidifies when it contacts the base soap. The combined colored material and base soap are then plodded together in a soap plodder, extruded as a multi-colored billet, cut to bar size and pressed to final shape. The colored material typically comprises from at least about 1 to about 50 percent by weight, preferably from about 10 to about 20 percent, of the coloring agent depending on the colored effect desired.

The weight ratio of colored material to base soap material is 1:50 to 1:1000 preferably 1:100 to 1:200, i.e., about 1 to 2 percent by weight depending on the colors used and the multicolored effect desired.

DESCRIPTIONS OF SPECIFIC EXAMPLES

The invention can be further illustrated by the following examples. All percentages given in the examples and elsewhere in the specification and claims are by weight unless stated otherwise.

EXAMPLE 1

| COLORED MATERIAL | BASE SOAP MATERIAL |
|---|---|
| 90% Paraffin Wax* | 49% olefin sulfonate detergent |
| 10% Monestrel Green GWD | 50% 17:83 coco:tallow sodium soap chips |
| | 1% perfume |

*Paraffin wax having the following properties:

| | |
|---|---|
| Melting Point (ASTM) | 122–124° F |
| Color (Saybolt) | 25–30 |
| Flash Point | 395° F. |
| Penetration at 32° F | 16 |
| Penetration at 77° F | 22 |
| 115° F | 221 |
| Saponification Value | 0 |
| Viscosity at 212° F | 39 Sec. S.U.V. |
| Structure | Crystalline |
| Specific Gravity | 0.880–0.915 |

The colored material is prepared by melting the paraffin wax in a vessel having heating means such as a heating coil or steam jacket and provision for mixing. The dye component is added to the liquid wax and dispersed therein by the mixer.

The base soap material is plodded through the upper barrel of a double barrel vacuum plodder and extruded in the form of segments, pellets or strands into the vaccum chamber between the plodder barrels. The colored material is withdrawn from the mixing apparatus, maintained in a molten state and introduced into the vacuum chamber according to the method and apparatus described in the Compa U.S. Pat. No. 3,609,828. A sufficient amount of the colored material to provide about 0.58% of colored material in the final multicolored soap product is supplied to the vacuum chamber.

The base soap material is at a temperature from about 65° F to 80° F and in accordance with a specific aspect of the invention the liquid colored material solidifies upon contact with the base soap material. The colored material and base soap are plodded together in the bottom plodder barrel and extruded through a die to form a continuous billet of soap. The billet is cut into bars of desired thickness and pressed to shape. The resulting bars have a white base with yellow variegations or stripes depending on the plodder and extrusion techniques used. After storage, and in use, the bars retain a distinctive multicolored appearance with little evidence of interface bleeding.

EXAMPLE 2

| COLORED MATERIAL | BASE SOAP MATERIAL |
| --- | --- |
| 85% Candelilla Wax* | 99% 17:83 Coco:tallow sodium soap chips |
| 15% D&C Yellow No. 10 | 1% Perfume |
| *Candelilla wax having the following properties: | |
| Melting Point | 149–156° F |
| Specific Gravity, 15° C | 0.982–0.993 |
| Acid Number | 11–19 |
| Saponification Number | 46–66 |
| Iodine Number | 15–36 |
| Moisture | Small percentage |
| Unsaponifiable Matter | 65–67% |
| Color | Tan |
| Refractive Index | 1.4555 |
| Odor | aromatic |
| Dielectric Constant | 2.50–2.63 |
| Effective Conductivity | 19 |
| Volume Resistivity | 120 |

The method of Example 1 is used to prepare the colored material and to combine the colored material and base soap material to result in about 2.0% colored material in the final product. The final bars have a whiteish base color with distinctive brown tinted green variegations. Virtually no evidence of interface bleeding is found after prolonged storage.

EXAMPLE 3

| COLORED MATERIAL | BASE SOAP MATERIAL |
| --- | --- |
| 90% Cetyl Alcohol* | 98% Coco Monoglyceride Detergent |
| 10% D&C Green No. 8 | 1% Perfume |
| | 1% Anti-bacterial agent |
| *Cetyl alcohol having the following properties: | |
| Melting Point | 115–125° F |
| Specific Gravity, 15° C | 0.810 |
| Boiling Point | 334° C |
| Iodine Number | <3 |
| Acid Number | 0 |
| Saponification Number | 0 |
| Unsaponifiable Matter | 98–100% |
| Ash | 0 |
| Refractive Index, 60° C | 1.4345 |
| Color | white |
| Form | crystalline |
| Heat of Fusion (cal/mol) | 8900 |

The method of Example 1 is used to produce a multicolored detergent bar of this formulation with 1.5% coloring material.

The bars exhibit distinct green regions against a light background and the absence of significant interface bleeding.

EXAMPLE 4

| COLORED MATERIAL | BASE SOAP MATERIAL |
| --- | --- |
| 80% Carbowax 1540* | 99%, 17:83 Coco:tallow sodium soap chips |
| 10% ultramarine blue | 1% perfume |
| *Carbowax having the following properties: | |
| Physical Appearance | Medium-hard, waxy solid |
| Density, g per cc at 20° C | 1.15 |
| Melting Range | 104–115° F |
| Viscosity Range, Saybolt Universal at 210° F | 100–150 sec |
| Flash Point, Open Cup | 460° F |

The method of Example 1 is used to produce a multicolored soap bar of this formulation having a colored material content of about 1% in the final soap bars.

The soap bars have a whiteish background with distinct blue striations and exhibit a virtual absence of interface bleeding.

EXAMPLE 5

| COLORED MATERIAL | BASE SOAP MATERIAL |
| --- | --- |
| 100% Cocoa Butter* | 98% 17:83 Coco:tallow sodium soap chips |
| | 1% perfume |
| | 1% antibacterial agent |
| *Cocoa Butter having the following properties: | |
| Melting Point | 90–95° F |
| Specific Gravity, 100–25° C | 0.858–0.864 |
| Saponification Number | 188–195 |
| Iodine Number | 35–40 |
| Refractive Index, 40° C | 1.4537–1.4578 |
| Reichter-Meissel Number | 0.1 |
| Polenske Number | 0.2 |

All of the bars produced by Examples 1–5 have distinct variegated areas of a different, preferably contrasting color with the base soap material.

The method of Example 1 is used to produce a multicolored soap bar of this formulation having a colored material content of 3% in the final soap bars.

The cocoa butter component has a natural yellowish color that provides the final soap bars with yellow striations against a light background. Other vehicle materials according to the invention are naturally colored i.e., include a coloring agent as they occur in nature, and do not require the addition of a separate coloring agent. For example candelilla wax has a natural brown or tan color, and carnauba wax is obtainable in grades having a yellow color.

Additionally, the base soap material can include a coloring agent to provide a colored base, such as pink, blue, yellow or green with contrasting white or colored variegated areas provided according to the invention, by the addition of colored material to the base soap material.

In further accordance with the invention, any of the methods of the prior art for producing multicolored soap bars using a liquid colored material combined with a base soap material can be used with any of the formulations of Examples 1–5 instead of the preferred method as disclosed in the aforementioned Compa et al patent.

For example, the colored materials of the invention can be sprayed on the soap chips before they are introduced into the upper barrel of a doubel barrel vaccum plodder, as shown and described in the Matthaei U.S. Pat. No. 3,769,225. Similarly, the colored material can be injected into the base soap mass at various points in the plodder as shown and described in the U.S. Pat. Nos. 3,832,431; 3,676,538 and 3,663,671. However, excellent results have been obtained with the method and apparatus described in the Compa et al U.S. Pat. No. 3,485,905, the disclosure of which is incorporated herein by reference, and this method is preferred.

The multicolored soap bars produced by the Examples 1–5 include a base soap material having a base color, typically light colored, and a plurality of veined areas of a color different from the base and preferably contrasting with the base color. The veined areas are randomly dispersed throughout the soap and appear on its surface as distinct stripes or variegations depending on the operating parameters of the process and apparatus used. The veined areas include the colored material i.e. wax vehicle and coloring agent and are stable during prolonged storage, i.e., 6 months or greater, as evidenced by a very little, if any, iinterface bleeding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for producing multicolored soap bars comprising the steps of, supplying to the vacuum chamber of a double barrel plodder which comprises upper and lower barrels separated by a vacuum chamber, a liquid colored material including a meltable solid vehicle in a melted state selected from wax and wax-like materials having a melting point above about 100° F and a water soluble dye, supplying a base soap material to said plodder, combining said colored material with said base soap material such that said colored material solidifies when in contact with said base soap material, in the lower barrel of said double barrel plodder to form a multicolored soap mass, extruding said multicolored soap mass to form a multicolored billet, subdividing said billet into bars and pressing said bars to a desired shape.

2. The method of claim 1 wherein said colored material is dripped or sprayed into said vacuum chamber.

3. The method of claim 1 wherein said colored material is a drippable or sprayable liquid at temperatures above about 100° F.

4. The method of claim 1 wherein said solid vehicle is chosen from the group consisting of natural waxes of mineral, animal or vegetable origin.

5. The method of claim 1 wherein said solid vehicle is a synthetic wax-like material.

6. The method of claim 1 wherein said colored material comprises from about 1 to about 50 percent by weight water soluble dye.

7. The method of claim 1 wherein the weight ratio of colored material to base soap material is from 1:50 to 1:1000.

* * * * *